United States Patent
Mccormick

(10) Patent No.: US 8,650,869 B1
(45) Date of Patent: Feb. 18, 2014

(54) AUTOMATIC HYDRAULIC/PNEUMATIC FLOW RECTIFIER FOR BI-DIRECTIONAL PUMPS

(75) Inventor: Michael E. Mccormick, Annapolis, MD (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 854 days.

(21) Appl. No.: 12/794,937

(22) Filed: Jun. 7, 2010

Related U.S. Application Data

(60) Provisional application No. 61/184,923, filed on Jun. 8, 2009.

(51) Int. Cl.
*F16D 31/02* (2006.01)

(52) U.S. Cl.
USPC .......................................................... 60/398

(58) Field of Classification Search
USPC .............. 60/398, 537, 568, 459, 461; 91/421, 91/433, 451, 452, 392, 397, 403
See application file for complete search history.

(56) References Cited

U.S. PATENT DOCUMENTS 6,476,511 B1 * 11/2002 Yemm et al. .................... 290/42
2003/0121408 A1 * 7/2003 Linerode et al. ................ 91/433

* cited by examiner

*Primary Examiner* — Edward Look
*Assistant Examiner* — Logan Kraft
(74) *Attorney, Agent, or Firm* — US Naval Research Laboratory; Suresh Koshy

(57) ABSTRACT

An apparatus includes a piston/rod assembly comprising a piston and a housing. The piston is translatable within the housing. The housing comprises a housing power side and a housing filler side. The housing power side comprises a housing power side intake/exhaust tap. The housing filler side comprises a housing filler side intake/exhaust tap. The apparatus also includes a flow rectifier comprising a flow rectifier power side and a flow rectifier filler side. The flow rectifier power side comprises a flow rectifier power side intake/exhaust tap communicating with the housing power side intake/exhaust tap. The flow rectifier filler side intake/exhaust tap communicates with the housing tiller side intake/exhaust tap.

7 Claims, 5 Drawing Sheets

US 8,650,869 B1

AUTOMATIC HYDRAULIC/PNEUMATIC FLOW RECTIFIER FOR BI-DIRECTIONAL PUMPS

CROSS-REFERENCE TO RELATED APPLICATION

This application claims priority to U.S. Provisional Patent Application Ser. No. 61/184,923, entitled "AUTOMATIC HYDRAULIC/PNEUMATIC FLOW RECTIFIER FOR BI-DIRECTIONAL PUMPS," to McCormick.

FIELD OF THE INVENTION

The present invention relates in general to an apparatus for wave energy conversion and more particularly to a flow rectifier to convert alternating flows for bi-directional pumps into oscillating uni-directional flows.

BACKGROUND OF THE INVENTION

Ocean energy comes in a variety of forms including tidal currents, ocean currents, and surface waves. Wave power is the transport of energy by surface waves, and the capture of that energy to do useful work.

Richard Peter McCabe devised the McCabe Wave Pump, which is described in U.S. Pat. No. 5,132,550, incorporated herein by reference. The McCabe Wave Pump consists of three rectangular steel pontoons which move relative to each other in the waves. The damper wave plate attached to the central pontoon ensures that it stays still as the fore and aft pontoons move relative to the central pontoon by pitching about the hinges. Energy is extracted from the rotation about the hinge points by linear hydraulic pumps mounted between the central and two other pontoons near the hinges.

Doug Hicks and Charles M. Pleass devised the Delbuoy wave-powered desalination unit, described in U.S. Pat. No. 5,013,219, U.S. Pat. No. 4,512,886, U.S. Pat. No. 4,421,461, U.S. Pat. No. 4,326,840, all of which are incorporated herein by reference. When the waves lift and then lower the Delbuoy, a piston connected to the bottom of the buoy drives a pump at the sea's floor. The pressure created by the piston is strong enough to drive the sea water through a reverse osmosis filter, which removes salt and impurities from the water, and then to send the fresh water through a pipe to the shoreline, where it is tapped and used by people.

BRIEF SUMMARY OF THE INVENTION

An embodiment of the instant invention includes an apparatus including a piston/rod assembly comprising a piston and a housing. The piston is translatable within the housing. The housing comprises a housing power side and a housing filler side. The housing power side comprises a housing power side intake/exhaust tap. The housing filler side comprises a housing filler side intake/exhaust tap. The apparatus also includes a flow rectifier comprising a flow rectifier power side and a flow rectifier filler side. The flow rectifier power side comprises a flow rectifier power side intake/exhaust tap communicating with the housing power side intake/exhaust tap. The flow rectifier filler side intake/exhaust tap communicates with the housing filler side intake/exhaust tap.

Optionally, the housing power side comprises a housing power side pressure tap. The flow rectifier power side comprises a flow rectifier power side intake valve and a flow rectifier power side exhaust valve. The flow rectifier filler side comprises a flow rectifier filler side intake valve and a flow rectifier filler side exhaust valve. The housing power side pressure tap communicates with the flow rectifier power side intake valve and the flow rectifier filler side exhaust valve. The housing filler side pressure tap communicates with the flow rectifier filler side intake valve and the flow rectifier power side exhaust valve.

Optionally, the housing power side comprises a housing power side pressure tap. The flow rectifier power side comprises a flow rectifier power side intake valve and a flow rectifier power side exhaust valve. The flow rectifier filler side comprises a flow rectifier filler side intake valve and a flow rectifier filler side exhaust valve. The housing power side pressure tap communicates with the flow rectifier filler side intake valve and the flow rectifier power side exhaust valve. The housing filler side pressure tap communicates with the flow rectifier power side intake valve and the flow rectifier filler side exhaust valve. Optionally, the apparatus further comprises a power take-off subsystem communicating with the flow rectifier. Optionally, the power take-off subsystem comprises a unidirectional turbine, a unidirectional pump, or a reverse osmosis desalination unit.

Optionally, the flow rectifier power side comprises a flow rectifier power side fluid feed tap and a flow rectifier power side fluid exhaust tap. The flow rectifier power side fluid feed tap communicates with the flow rectifier power side intake/exhaust tap if the flow rectifier power side exhaust valve is open and the flow rectifier power side intake valve is closed. The flow rectifier power side fluid exhaust tap communicates with the flow rectifier power side intake/exhaust tap if the flow rectifier power side exhaust valve is closed and the flow rectifier power side intake valve is open. The flow rectifier tiller side comprises a flow rectifier filler side fluid feed tap and a flow rectifier filler side fluid exhaust tap. The flow rectifier filler side fluid feed tap communicates with the flow rectifier filler side intake/exhaust tap if the flow rectifier filler side exhaust valve is open and the flow rectifier filler side intake valve is closed. The flow rectifier power side fluid exhaust tap communicates with the flow rectifier filler side intake/exhaust tap if the flow rectifier filler side exhaust valve is closed and the flow rectifier filler side intake valve is open.

DETAILED DESCRIPTION OF THE INVENTION

Figure 1:
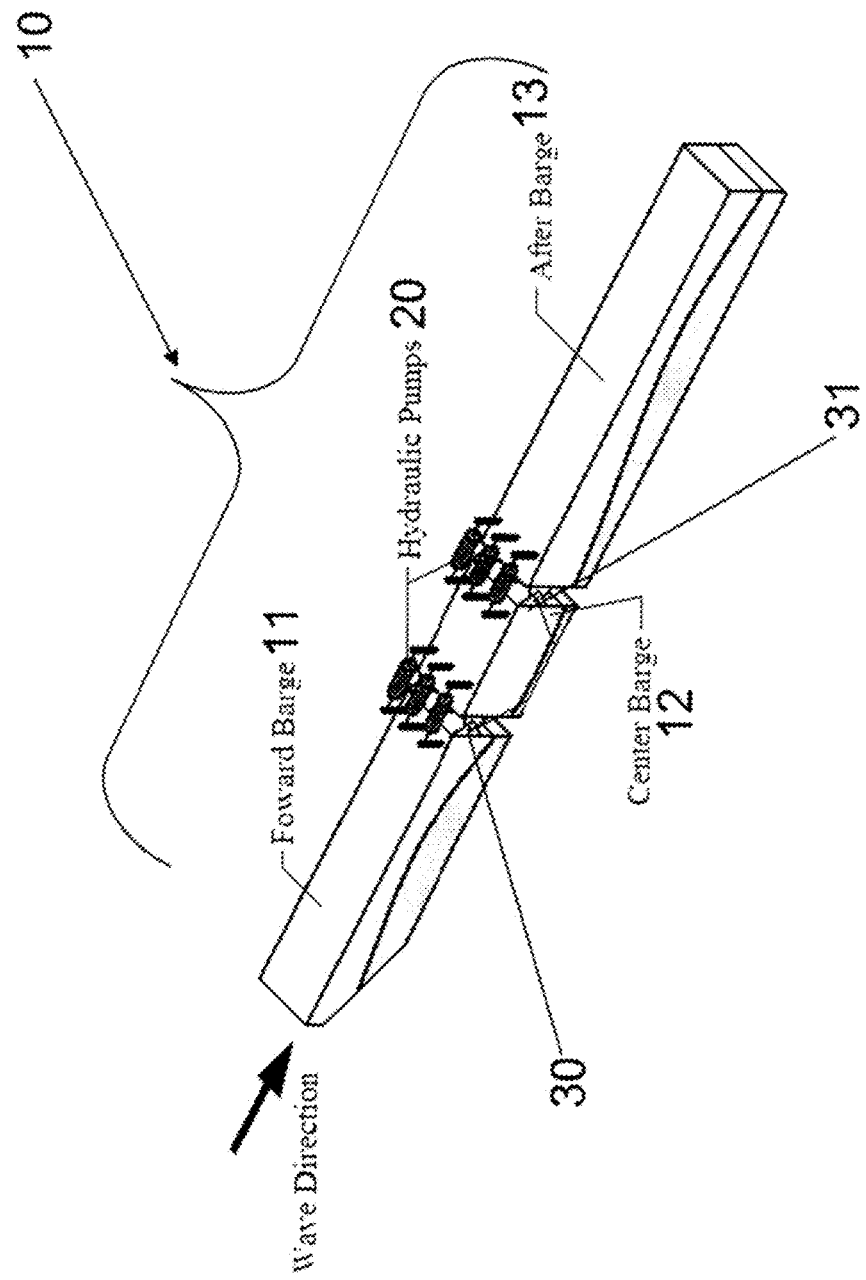
FIG. 1 is a perspective view of an articulated barge system including an embodiment of the instant invention.

An apparatus for converting the energy of ocean surface waves into useable energy forms includes an articulated barge system. This type of system consists of two or more barges that are hinged together. FIG. 1 shows an illustrative three-barge system 10 with a forward barge 11, a center barge 12, and an after barge 13 connected by hinges 30, 31.

A power take-off sub-system is a shaft that transfers mechanical power between mechanical systems. In embodiments of the instant invention, power take-off is the transformation the wave-power to pneumatic-power or hydraulic power. An embodiment of the instant invention includes at least two power take-off sub-systems, e.g., a first power take-off sub-system and a second power take-off sub-system. The first power take-off sub-system 20 from the articulated barge system 10 is, for example, a bi-directional hydraulic pump. By itself, the bi-directional hydraulic pump produces an alternating current through a bi-directional turbo-generator. The problem with the alternating flows in wave energy conversion is that the energy losses are high due to the residual wakes which occur both upstream and down stream of the power take-off sub-system 20.

A hydraulic/pneumatic flow rectifier 40 overcomes the losses due to the alternating flow, and is connected to the first power take-off sub-system 20. The choice of a hydraulic or a pneumatic flow rectifier depends on the fluid in the firstpower take-off sub-system 20. If the fluid in the power take-off sub-system is a hydraulic fluid, then a hydraulic flow rectifier is used. If the fluid in the power take-off sub-system is air, then a pneumatic flow rectifier is used. The rectifier 40 is an automatic control system to the extent described as follows. The rectifier 40 produces a uni-directional flow to excite subsystems for the production of electricity, pumping fluids (e.g., water, air, or oil) and/or for the production of potable water.

Figure 2:
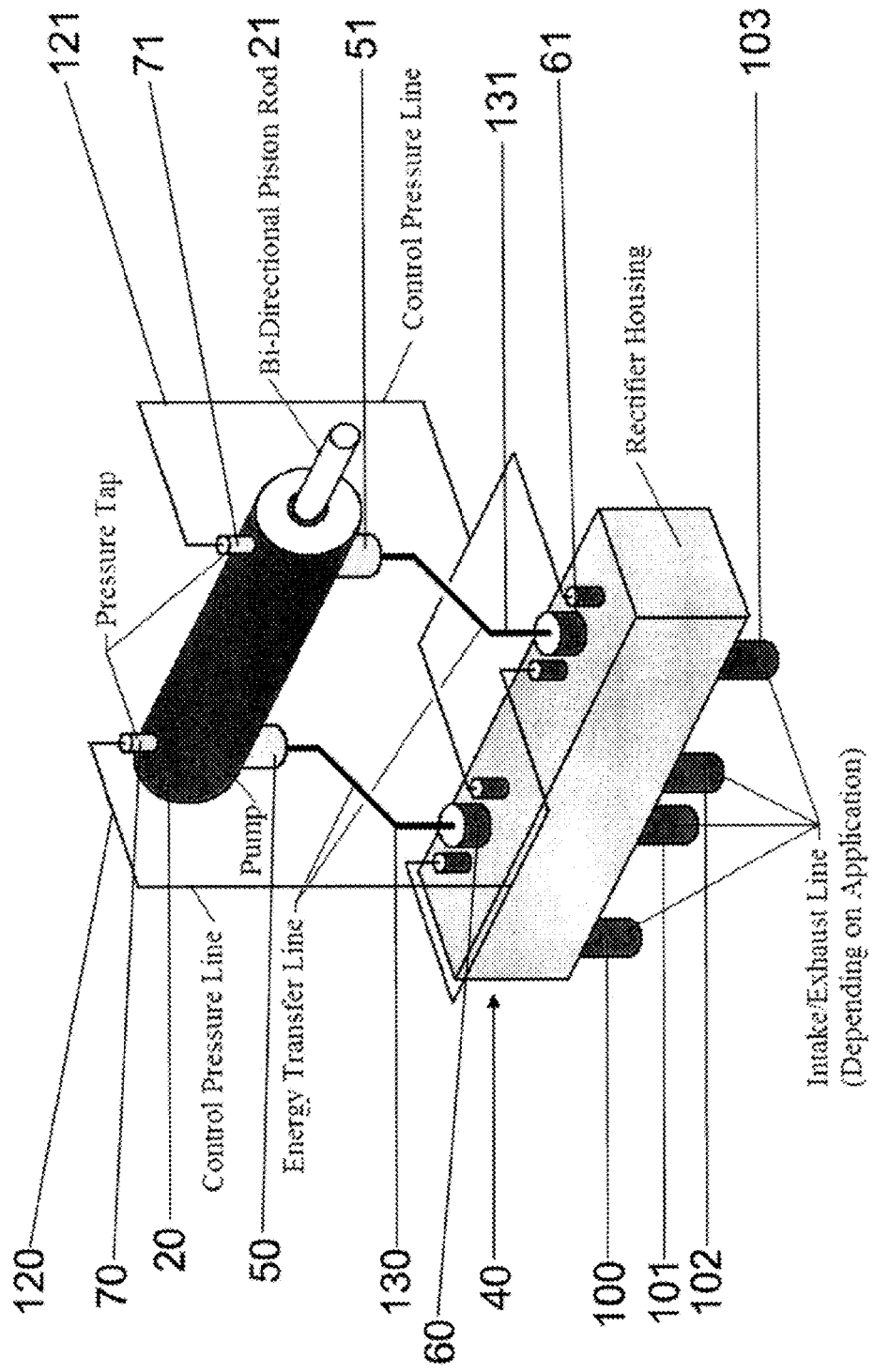
FIG. 2 is a perspective view of a piston/rod assembly and a flow rectifier according to an embodiment of the instant invention.

An illustrative embodiment of the invention is shown in FIG. 2. Specifically, the first power take-off sub-system 20 (in this example, a bi-directional pump) and the flow rectifier 40 are shown. The relative positions of the bi-directional pump 20 and the flow rectifier 40 are not significant in the operation of the system. The external hydraulic/pneumatic lines connecting the pump and the control system are represented by bold and thin lines in FIG. 2. The bold lines are the energy transfer lines; while, the thin lines are the pressure control lines.

Figure 3:
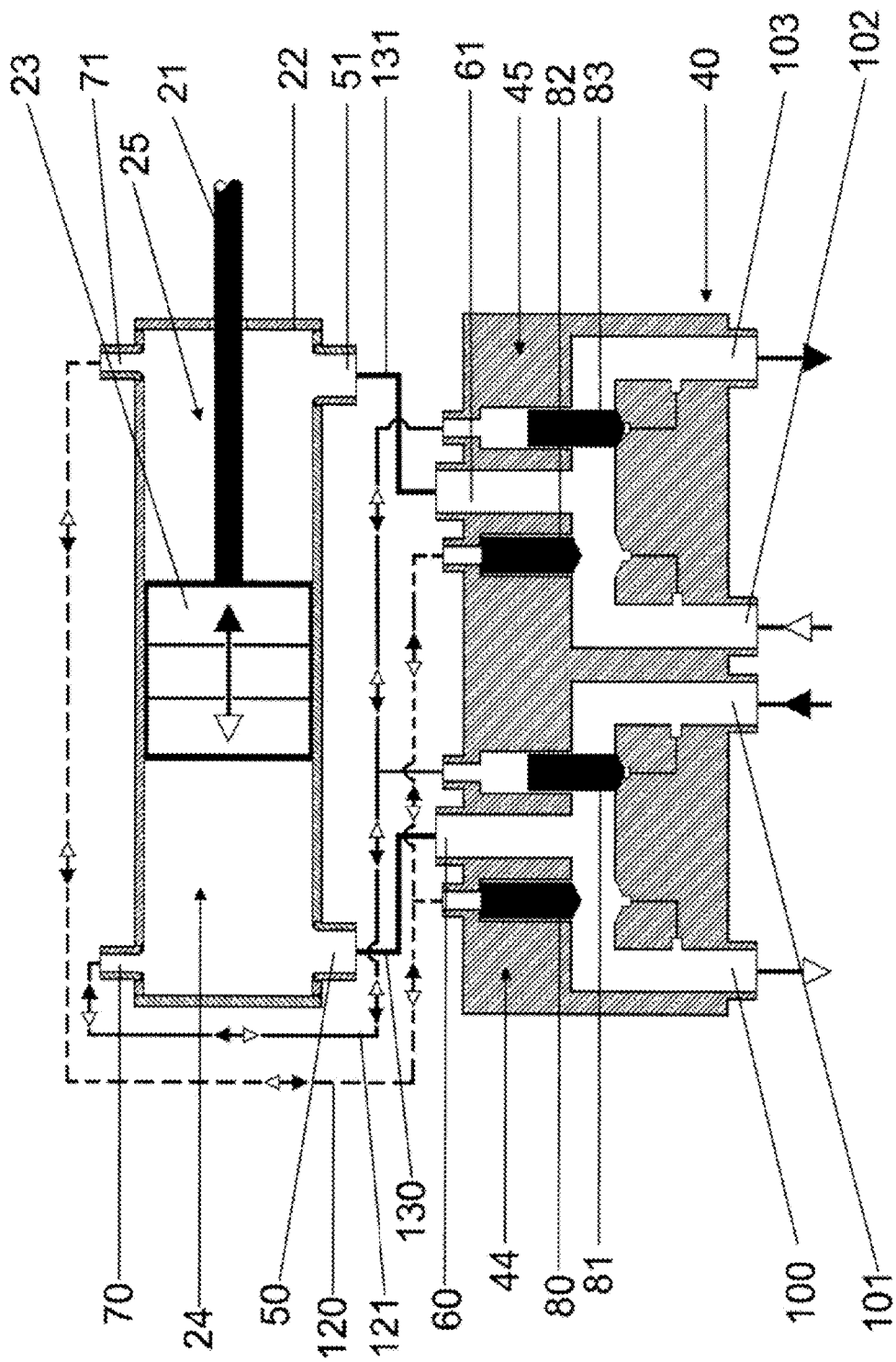
FIG. 3 is a cross-sectional view of the piston/rod assembly and the flow rectifier according to an embodiment of the instant invention, wherein the figure is also a fluid diagram of illustrative fluid flow.

An embodiment of the instant invention, as shown by way of example in FIG. 3, includes an apparatus including a piston/rod assembly 21 comprising a piston 23 and a housing 22. The piston 23 is translatable within the housing 22. The housing 22 comprises a housing power side 24 and a housing filler side 25. The housing power side 24 comprises a housing power side intake/exhaust tap 50. The housing filler side 25 comprises a housing filler side intake/exhaust tap 51. The apparatus also includes the flow rectifier 40 comprising a flow rectifier power side 44 and a flow rectifier filler side 45. The flow rectifier power side 44 comprises a flow rectifier power side intake/exhaust tap 60 communicating with the housing power side intake/exhaust tap 50. The flow rectifier filler side intake/exhaust tap 61 communicates with the housing filler side intake/exhaust tap 51.

Optionally, the housing power side 24 comprises a housing power side pressure tap 70. The flow rectifier power side 44 comprises a flow rectifier power side intake valve 80 and a flow rectifier power side exhaust valve 81. The flow rectifier filler side 45 comprises a flow rectifier filler side intake valve 82 and a flow rectifier filler side exhaust valve 83. The housing power side pressure tap 70 communicates with the flow rectifier filler side intake valve 80 and the flow rectifier filler side exhaust valve 83. The housing filler side pressure tap 71 communicates with the flow rectifier filler side intake valve 82 and the flow rectifier power side exhaust valve 81.

Figure 5:
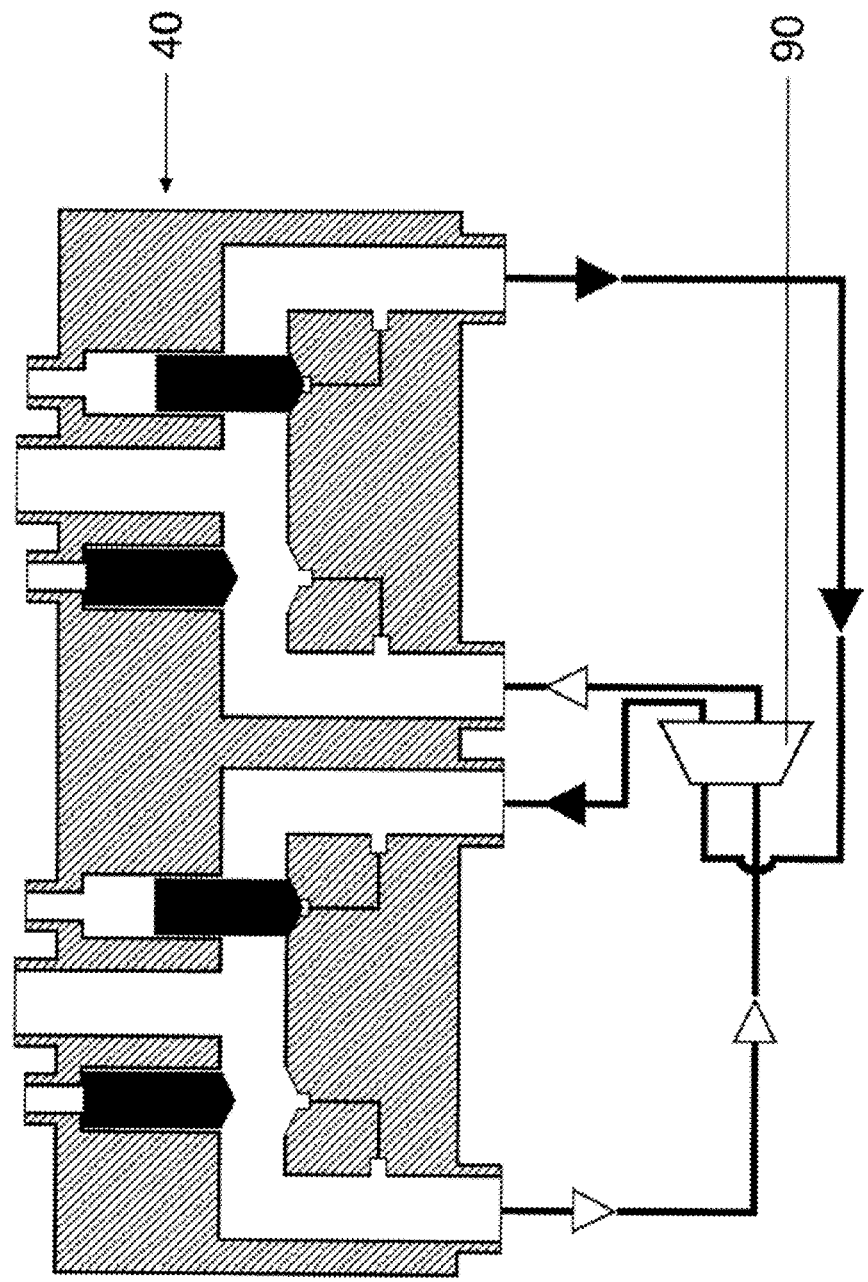
FIG. 5 is a cross-sectional and schematic view of the flow rectifier and a power take-off subsystem according to an embodiment of the instant invention, wherein the figure is also a fluid diagram of illustrative fluid flow.

Optionally, the housing power side 24 comprises a housing power side pressure tap 70. The flow rectifier power side 44 comprises a flow rectifier power side intake valve 80 and a flow rectifier power side exhaust valve 81. The flow rectifier filler side 45 comprises a flow rectifier filler side intake valve 82 and a flow rectifier filler side exhaust valve 83. The housing power side pressure tap 70 communicates with the flow rectifier filler side intake valve 82 and the flow rectifier power side exhaust valve 81. The housing filler side pressure tap communicates with the flow rectifier power side intake valve 80 and the flow rectifier filler side exhaust valve 83. Optionally, as shown in FIG. 5, the apparatus further comprises a second power take-off subsystem 90 communicating with the flow rectifier 40. Optionally, the second power take-off subsystem 90 comprises a unidirectional turbine, a unidirectional pump, or a reverse osmosis desalination unit.

Optionally, the flow rectifier power side 44 comprises a flow rectifier power side fluid feed tap 101 and a flow rectifier power side fluid exhaust tap 100. The flow rectifier power side fluid feed tap 101 communicates with the flow rectifier power side intake/exhaust tap 60 if the flow rectifier power side exhaust valve 81 is open and the flow rectifier power side intake valve 80 is closed. The flow rectifier power side fluid exhaust tap 100 communicates with the flow rectifier power side intake/exhaust tap 60 if the flow rectifier power side exhaust valve 81 is closed and the flow rectifier power side intake valve 80 is open. The flow rectifier filler side 45 comprises a flow rectifier filler side fluid feed tap 102 and a flow rectifier filler side fluid exhaust tap 103. The flow rectifier filler side fluid feed tap 102 communicates with the flow rectifier filler side intake/exhaust tap 61 if the flow rectifier filler side exhaust valve 82 is open and the flow rectifier filler side intake valve 83 is closed. The flow rectifier power side fluid exhaust tap 103 communicates with the flow rectifier filler side intake/exhaust tap 61 if the flow rectifier filler side exhaust valve 82 is closed and the flow rectifier filler side intake valve 83 is open.

Figure 4:
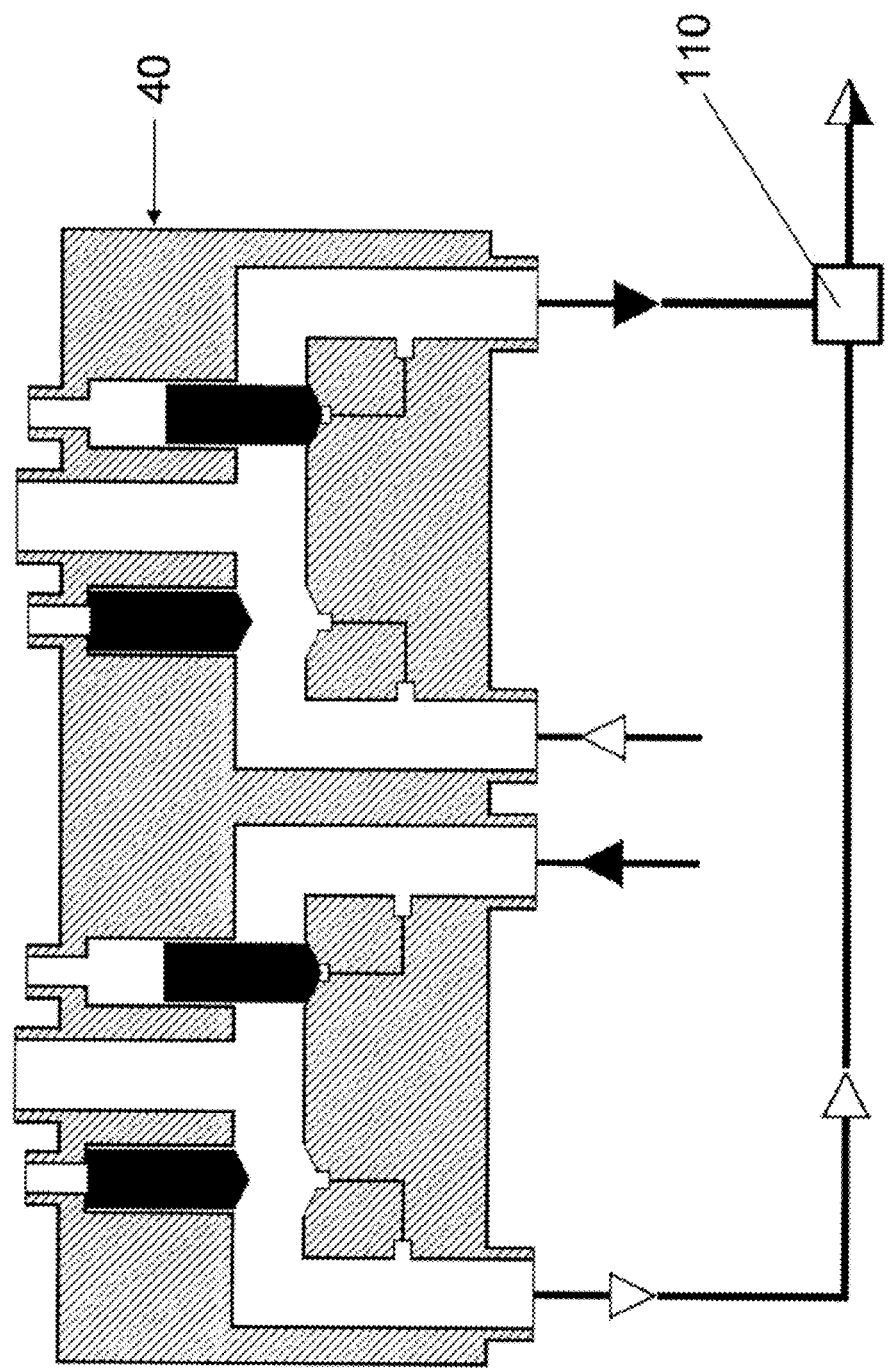
FIG. 4 is a cross-sectional view of the flow rectifier and a junction or manifold according to an embodiment of the instant invention, wherein the figure is also a fluid diagram of illustrative fluid flow.

As shown by way of example in FIG. 4, applications of embodiments of the instant invention optionally required a standard junction or standard coupler or standard manifold 110 connecting the flow rectifier power side fluid feed and exhaust taps 101, 100, and the flow rectifier filler side fluid feed and exhaust taps 102, 103.

Referring to FIG. 3, illustrative operation of an embodiment of the instant invention is described as follows. The fluid flow convention used herein is as follows: the black arrowheads show fluid flow when the piston/rod assembly is in its filler stroke; the white arrowheads show fluid flow when the piston/rod assembly is in its power stroke. The first power take-off sub-system 20, for example, includes a bi-directional pump, and the bi-directional pump includes a piston/rod assembly 21. By way of example, diameter of the bi-directional pump 20 is within a range of 0.5 ft to 0.75 ft. All other dimensions are scaled based on the stroke and bore of the pump.

The piston/rod assembly 21 is excited by an alternating energy source, e.g., ocean surface waves, as the barges of the articulated barge system 10 move toward and away from each other. The piston/rod assembly 21 travels in alternating directions over the period associated with the energy source (e.g., the surface waves), in the piston housing 22. The to and fro motions create alternating pressures in the pressure taps 70, 71 due to the alternating piston-rod assembly 20 motions. The alternating pressures are transmitted through control pressure lines 120, 121, producing alternating pressure forces with directions shown illustratively by the fluid flow arrows in FIG. 3. The piston-rod assembly motions cause the fluid in the pump 20 to be alternatively expelled at high pressure and refilled at low pressure through the intake/exhaust taps 50, 51. The alternating flows through the taps 50, 51 are transmitted through the intake/exhaust lines 130, 131. The pressure forces in the control pressure lines 120, 121 alternately cause the valves 80, 81, 82, and 83 to open and close. For example, if a cone-head valve is used, then the cone-head of the valves mates with the conical valve seat, when the valve is closed. When the valve is to be opened by the pressure force in a control pressure line 120, 121, fluid is passed into the seat through a relief tap. The taps are interconnected by the pressure relief lines.

The pressures in the fluid feed and fluid exhaust taps depend on the application of the system. Two examples are presented here. The first application is the open system shown by way of example in FIG. 4. In the open system, the operating fluid is exchanged with the environment. For example, a desalination system would draw the supply (i.e., salt or brackish) water from the ambient brine. The operating fluid is not retained by the embodiment of the instant invention and used over and over. In FIG. 4, the high-pressure flow in the high-pressure feed flow lines travel to the manifold 110 from the top left-hand side in the figure. The low-pressure flow in the low-pressure intake flow lines travel to the manifold 110 from the bottom right-hand side in the figure. The source of the fluid flow into the fluid feed taps 101, 102 is the ambient fluid in question (e.g., water, air, or oil). The fluid flow components through the fluid exhaust taps are combined in the manifold 110 and supplied to the final destination through the high-pressure flow line. The fluid flow destination from the manifold 110, for example, is, a reverse-osmosis desalination system. Hence, over an operational cycle, the flow enters from an external source and is supplied to an external destination.

The second application is a closed system, and is shown by way of example in FIG. 5. In A closed system, the operating fluid does not leave the embodiment of the instant invention. The high-pressure fluid enters the second power take-off system 90, excites the system and is exhausted at low pressures through the low-pressure lines. The second power take-off system 90 is, for example, a turbine or pump.

The power take-off from the articulated barge system was discussed above using a bi-directional pump as an example. However, in an alternative embodiment, the power take-off 20 from the articulated barge system 10 is more generally a standard rotational generator.

Illustrative valves that are acceptable for use in various embodiments of the instant invention, depending on their applications, include standard cone-head valves, standard ball-and-cage valves, and standard pressure-dependent, hinge flaps.

For the purpose of this specification, although reference has been made specifically to water, it should be understood that alternative operating fluids are acceptable including, for example, air or oil.

For the purpose of this specification, although reference has been made specifically to ocean surface waves, one of ordinary skill in the art will recognize that surface waves are present in other bodies of water, including but not limited to lakes and rivers. Accordingly, embodiments of the instant invention are readily adaptable to surface waves, other than those found in the ocean.

Because numerous modifications and variations of the above-described invention will occur to those of ordinary skill in the art, it is not desired to limit the invention to the exact construction and operation illustrated and described. Accordingly, all suitable modifications and equivalents may be resorted to, falling within the scope of the invention.

What is claimed as new and desired to be protected by Letters Patent of the United States is:

1. An apparatus comprising:
an alternating wave pressure-activated piston/rod assembly comprising a piston and a housing, said piston being translatable within said housing, said housing comprising a housing power side and a housing filler side, said housing power side comprising a housing power side intake/exhaust tap, said housing filler side comprising a housing filler side intake/exhaust tap; and
a flow rectifier comprising a flow rectifier power side and a flow rectifier filler side, said flow rectifier power side comprising a flow rectifier power side intake/exhaust tap communicating with said housing power side intake/exhaust tap, said flow rectifier filler side intake/exhaust tap communicating with said housing filler side intake/exhaust tap, wherein said housing power side comprises a housing power side pressure tap, said housing filler side comprising a housing filler side pressure tap, said flow rectifier power side comprising a flow rectifier power side intake valve and a flow rectifier power side exhaust valve, said flow rectifier filler side comprising a flow rectifier filler side intake valve and a flow rectifier filler side exhaust valve, said housing power side pressure tap communicating with said flow rectifier power side intake valve and said flow rectifier filler side exhaust valve, said housing filler side pressure tap communicating with said flow rectifier filler side intake valve and said flow rectifier power side exhaust valve.

2. The apparatus according to claim 1, further comprising a power take-off subsystem communicating with said flow rectifier.

3. The apparatus according to claim 2, wherein said power take-off subsystem comprises one of a unidirectional turbine, a unidirectional pump, and a reverse osmosis desalination unit.

4. An apparatus comprising:
an alternating wave pressure-activated piston/rod assembly comprising a piston and a housing, said on being translatable within said housing, said housing comprising a housing power side and a housing filler side, said housing power side comprising a housing power side intake/exhaust tap, said housing filler side comprising a housing filler side intake/exhaust tap; and
a flow rectifier comprising a flow rectifier power side and a flow rectifier filler side, said flow rectifier power side comprising a flow rectifier power side intake/exhaust tap communicating with said housing power side intake/exhaust tap, said flow rectifier filler side intake/exhaust tap communicating with said housing filler side intake/exhaust tap, wherein said housing power side comprises a housing power side pressure tap, said housing filler side comprising a housing filler side pressure tap, said flow rectifier power side comprising a flow rectifier power side intake valve and a flow rectifier power side exhaust valve, said flow rectifier filler side comprising a flow rectifier filler side intake valve and a flow rectifier filler side exhaust valve, said housing power side pressure tap communicating with said flow rectifier filler side intake valve and said flow rectifier power side exhaust valve, said housing filler side pressure tap communicating with said flow rectifier power side intake valve and said flow rectifier filler side exhaust valve.

5. The apparatus according to claim 4, further comprising a power take-off subsystem communicating with said flow rectifier.

6. The apparatus according to claim 5, wherein said power take-off subsystem comprises one of a unidirectional turbine, a unidirectional pump, and a reverse osmosis desalination unit.

7. An apparatus comprising:
an alternating wave pressure-activated piston/rod assembly comprising a piston and a housing, said piston being translatable within said housing, said housing comprising a housing power side and a housing filler side, said housing power side comprising a housing power side intake/exhaust tap, said housing filler side comprising a housing filler side intake/exhaust tap; and
a flow rectifier comprising a flow rectifier power side and a flow rectifier filler side, said flow rectifier power side comprising a flow rectifier power side intake/exhaust tap communicating with said housing power side intake/exhaust tap, said flow rectifier filler side intake/exhaust tap communicating with said housing filler side intake/exhaust tap, wherein said flow rectifier power side comprises a flow rectifier power side fluid feed tap, a flow rectifier power side exhaust valve, a flow rectifier power side intake valve, and a flow rectifier power side fluid exhaust tap, said flow rectifier power side fluid feed tap communicating with said flow rectifier power side intake/exhaust tap if said flow rectifier power side exhaust valve is open and said flow rectifier power side intake valve is closed, said flow rectifier power side fluid exhaust tap communicating with said flow rectifier power side intake/exhaust tap if said flow rectifier power side exhaust valve is dosed and said flow rectifier power side intake valve is open, said flow rectifier filler side comprises a flow rectifier filler side fluid feed tap, a flow rectifier filler side exhaust valve, a flow rectifier filler side intake valve, and a flow rectifier filler side fluid exhaust tap, said flow rectifier filler side fluid feed tap communicating with said flow rectifier filler side intake/exhaust tap if said flow rectifier filler side exhaust valve is open and said flow rectifier filler side intake valve is closed, said flow rectifier power side fluid exhaust tap communicating with said flow rectifier filler side intake/exhaust tap if said flow rectifier filler side exhaust valve is open and said flow rectifier filler side intake valve is closed.

* * * * *